United States Patent Office 2,978,437
Patented Apr. 4, 1961

2,978,437
WATER-INSOLUBLE CONDENSATION PRODUCTS OF ALDEHYDES AND ACRYLAMIDE INTERPOLYMERS

Roger M. Christenson, Richland Township, Allegheny County, Pa., assignor to Pittsburgh Plate Glass Company, Allegheny County, Pa., a corporation of Pennsylvania No Drawing. Filed June 12, 1957, Ser. No. 665,109

11 Claims. (Cl. 260—72)

This invention relates to a method for preparing resinous polymeric materials particularly useful in coating compositions, and pertains more specifically to the preparation of polymeric materials from at least three monomers, one of which is a polymerizable amide, and another of which is an ethylenically unsaturated carboxylic acid which acts as a cure accelerating catalyst.

In a copending application, Serial No. 490,409, filed February 24, 1955, now abandoned, and refiled as Serial No. 594,391 as of June 28, 1956, it is disclosed that useful resinous materials are readily obtained by reacting an aldehyde, particularly formaldehyde, with an interpolymer of acrylamide and one or more polymerizable ethylenically unsaturated monomers. The resulting resins range from soft flexible materials to very hard solids, depending upon the choice of monomers utilized in preparing the acrylamide interpolymer which in turn is reacted with the aldehyde. The resins are useful in coating compositions, giving very tough and mar-resistant films which possess excellent chemical resistance.

However, coating compositions containing the resinous materials described in the copending application often require the addition of a catalyst such as phosphoric acid or citric acid, before films thereof will cure to a satisfactory state at temperatures ordinarily employed in baking films of automobile and appliance finishes. The use of an "external" catalyst is not desirable since it frequently must be added by the ultimate user of the coating composition who ordinarily is not interested in handling two package systems or in adding anything to the coating composition which must be employed in carefully controlled amounts, such as is the case when a catalyst is utilized.

Most of the coating compositions also contain pigments such as titanium dioxide and others. Compositions which have been catalyzed with free acids often tend to be unstable during storage. As a result of this instability, it is difficult to obtain films of adequate gloss from compositions which have been stored for a substantial period of time.

It has now been discovered that the use of an "external" catalyst is unnecessary if a small quantity of an ethylenically unsaturated carboxylic acid is included as one monomeric component in the preparation of the unsaturated amide-containing interpolymer. The polymeric materials obtained by this method have been found to cure readily at relatively low temperatures, the ethylenically unsaturated carboxylic acid appearing to function as an "internal" catalyst. Consequently, it is not necessary to add further catalyst to obtain a satisfactory cure.

Pigmented compositions from the interpolymers containing an internal catalyst are much more stable than those containing a free acid such as phosphoric acid or citric acid. These internally catalyzed compositions, even when they have been stored for several weeks, are still capable of forming films which when baked, are of high gloss.

Moreover, coating compositions prepared from interpolymers produced by the method of this invention form films with excellent flexibility, excellent recoat adhesion and freedom from undesirable color formation, in addition to being outstanding in appearance, gloss, mar-resistance, color retention, moisture resistance, stain resistance, grease resistance, heat resistance, detergent resistance, corrosion resistance, adhesion and flexibility. As a result, compositions obtained by this method are particularly useful in finishes for appliances, such as ranges, refrigerators, air conditioners, washers, water heaters, and, in fact in general industrial finishes on solid surfaces such as metals, plastics, wall board, and the like.

In accordance with the present invention, acrylamide or other polymerizable amide is polymerized with at least two other ethylenically unsaturated monomeric compounds, one of which is an ethylenically unsaturated carboxylic acid to form an interpolymer, which may either be used per se, or reacted with an aldehyde to form a modified interpolymer. The exact mechanism whereby the amide interpolymers are obtained is not definitely known, but is believed to begin by the formation initially of a relatively short chain soluble interpolymer having an approximate structure as follows, acrylamide being utilized for illustrative purposes:

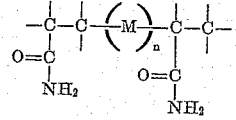

wherein M represents a unit of a monomer polymerizable with acrylamide, and $n$ represents a whole number greater than 1. Presumably at least some of the groups M are of the ethylenically unsaturated acid. The carboxyls of the latter are in pendant position. A part of the groups M may be of other monomers. For example, if styrene were utilized as the second monomer, M would represent the unit

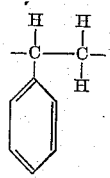

In each of the monomers utilized a group of the formula $>C=CH_2$ is attached to a negative radical.

The short chain interpolymer then reacts with an aldehyde or a material which reacts as an aldehyde to provide the structure:

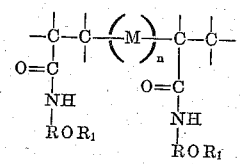

where the group $—ROR_1$ replaces amido hydrogen and in which R is a lower aliphatic hydrocarbon radical and $R_1$ is a member of a class consisting of hydrogen and lower alkyl radicals and M and $n$ have significance previously attached thereto.

If the aldehyde is formaldehyde, the resultant structure is:

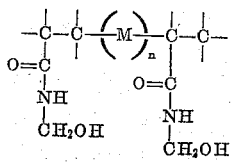

where M and n are of the significance previously indicated.

In the event the formaldehyde is utilized in the form of a solution in butanol or other alkanol, etherification may take place so that at least some of the methylol groups in the above structure will be converted to groups of the structure:

—CH$_2$O Alkyl the alkyl group being derived from the alkanol utilized. The amount of etherification taking place depends in large measure upon the pH of the reaction medium, with acid conditions favoring etherification. The etherification of the acrylamide interpolymer is analogous to the conventional butylation of urea and melamine resins.

It will be recognized that amides such as acrylamide or methacrylamide may be reacted with formaldehyde or an agent such as trioxymethylene acting as formaldehyde to form methylol acrylamide or methylol methacrylamide and either of these methylol derivatives may be interpolymerized with the other monomer component or components containing an ethylenically unsaturated acid such as acrylic or methacrylic acid. The resultant interpolymers are the same as, or at least very similar to those resulting when the monomers are first interpolymerized and the interpolymer is then reacted with formaldehyde.

Needless to say, if the reaction between the formaldehyde and acrylamide or methacrylamide is conducted in the presence of a butylating agent such as butyl alcohol, a substantial number of the hydroxyls are converted to butoxy groups of the formula: —O-butyl. The resultant product has the formula:

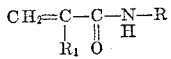

An advantage of the use of an acrylamide or methacrylamide derivative of the formula

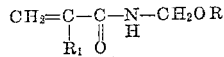

where R is hydrogen or alkyl such as butyl and R$_1$ is hydrogen or methylene, resides in the fact that the step of reacting the interpolymer with formaldehyde is obviated. The several monomers including the acid monomer and methylol acrylamide or methylol acrylamide and/or their butoxy derivatives may be mixed and interpolymerized to provide a finished product in one step.

Among the non-acid, non-amide monomers which may be polymerized with acrylamide or N-methylol or N-methylbutoxy derivatives thereof, are included methyl acrylate, ethyl acrylate, butyl acrylate, isobutyl acrylate, hexyl acrylate, octyl acrylate, styrene, vinyl toluene, maleate esters such as dibutyl maleate, vinyl ether, vinyl ketones, vinyl pyridines, allyl acetoacetates, glycidyl acrylate, dimethylbenzyl methacrylate, and the like. In general, it is preferred that the monomer utilized contain a single CH$_2$=C< group in terminal position, and an especially preferred group of monomers includes methyl methacrylate, butyl methacrylate, ethyl acrylate, butyl acrylate, methyl acrylate, styrene, vinyl toluene, and monomethyl styrene.

Preferred amide interpolymers are obtained in accordance with this invention when at least two monomeric compounds are interpolymerized with the amide and the ethylenically unsaturated carboxylic acid. In this manner it is possible to tailor the interpolymer to have any desired degree of hardness or flexibility. For example, one particularly useful interpolymer is prepared from acrylamide, ethyl acrylate, styrene, and acrylic acid. In place of acrylamide, any other polymerizable amide, for example, methacrylamide, or itaconic diamide, may be utilized.

Interpolymers of polymerizable amides such as acrylamide, an ethylenically unsaturated carboxylic acid, and at least one other polymerizable monomer are most readily prepared by carrying out the polymerization in a solvent in which the monomers are soluble and at reflux temperatures. Butanol has proven to be a satisfactory solvent in most cases. Isopropyl alcohol, butyl Cellosolve, and mixtures of butanol or other lower alkanol with water can also be used advantageously as solvents. Some care must be exercised when water is present in the system as gummy precipitates may result, especially at the higher water levels. The presence of lower alcohols or water has been found to moderate the speed of reaction by lowering the reflux temperature. Butyl or ethyl acetate, or other ester solvents, and hydrocarbons such as xylene and the like may also be employed.

Any ethylenically unsaturated carboxylic acid may be employed as the internal catalyst in accordance with the method of this invention. Included among such materials are acrylic acid, methacrylic acid, crotonic acid, maleic acid, fumaric acid, itaconic acid, and the like. These contain an ethylenic group and from about 3 to 5 carbon atoms. Those in which the ethylenic group has the form CH$_2$=C< are considered to be especially useful. All of these specific compounds as well as other ethylenically unsaturated carboxylic acids, including the half esters of unsaturated dicarboxylic acids such as butyl acid maleate, impart to the interpolymers desirable fast cure properties.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economic of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions mixtures of the above peroxygen compounds are used to secure desired conversions.

The diazo compounds, such as p-methoxyphenyl diazo-thio-(2-naphthyl) ether, may also be used as polymerization catalysts in the preparation of acrylamide interpolymers. Redox catalyst systems can be also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers, the bulk of the catalyst is added initially and later additions are used only to secure desired conversions. Larger amounts of catalyst added initially give lower viscosities.

Since it is desirable that the interpolymers of acrylamide with other ethylenically unsaturated monomers be relatively low in molecular weight so that can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by mixing the acrylamide, or other polymerizable amide, the unsaturated carboxylic acid, and the other monomer or monomers, the catalyst and chain modifying agent, if any, in the solvent, and refluxing the resulting solution for a time sufficient to obtain the desired conversion. Solvents may comprise aromatic solvents such as toluene or xylene or alcohols such as propyl or butyl alcohol. A preferred solvent medium for the interpolymerization reaction comprises a mixture of an aromatic hydrocarbon, e.g. xylene and an alcohol, e.g. butyl alcohol. The proportions of the solvents may be in a range of about 25 percent of either solvent, the rest of the solvent mixture being the other. A very satisfactory mixture comprises 50 percent by weight of each. Three or more solvents may also be used, if desired.

An alcohol component such as butyl alcohol will also tend to react with free or combined acids in the interpolymerizable mixture, thereby lowering the acid value of the interpolymer to a substantial extent. The acid value will often be several points below the theoretical value derivable from consideration of the added acid or acids.

Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization because of the very rapid reaction rate and because the reaction is highly exothermic. Some control of the heat of reaction is obtained by adding the acrylamide or other amide to the polymerization mixture incrementally. Good agitation is also desirable.

Another method for preparing acrylamide interpolymers involves utilization of "block" or "graft" techniques. Conventional polymerization procedures, such as that described in the foregoing paragraph, ordinarily result in a random distribution of the components in the interpolymers. By "block" or "graft" methods, the component can be introduced into the composition in regular sequence or order, each segment being of a certain length and periodicity. These products can be made such that the acrylamide portion is in fixed position in the chain, this approach involving the preparation of segments which react in groups or react in sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

The interpolymers prepared by the foregoing methods are useful per se in coating compositions and for other uses. However, preferably the interpolymers are reacted with an aldehyde. Formaldehyde, in solution in water (formalin) or in a lower alcohol such as butanol, or a formaldehyde yielding substance such as paraformaldehyde, trioxymethylene, or hexamethylene-tetraamine, is greatly preferred. However, other monoaldehydes including acetaldehyde, butyraldehyde, furfural, and the like, preferably containing only atoms of carbon, hydrogen, and oxygen, can also be used. The aldehydes contain from 1 to 5 carbon atoms.

It is preferred that the aldehyde be reacted with an interpolymer containing from about 5 percent to about 50 percent by weight of acrylamide, the balance being the other ethylenically unsaturated monomer(s). It has been found that those interpolymers containing the higher levels of acrylamide with those monomers which ordinarily form hard homopolymers, give hard and flexible films, whereas interpolymers containing lower levels of acrylamide with those monomers which ordinarily form soft homopolymers tend to be considerably softer. If more than one ethylenically unsaturated monomer is polymerized with acrylamide, the proportions of such additional monomers utilized will depend upon the characteristics which such monomer or monomers will impart to the final interpolymer. For example, in some interpolymer systems, it may be desirable to utilize about 20 percent acrylamide. The remainder of the monomers in the system preferably comprise (A) ethylenically unsaturated acid such as acrylic acid in an amount of about 1 to 30 percent by weight based upon the total of the interpolymerizable components. The rest (B) is the added monomer and of course is not ethylenically unsaturated amide or ethylenically unsaturated carboxylic acid. The added monomer constitutes about 20 to 94 percent of the mixture. It may be ethylenic hydrocarbon, neutral ethylenic ester or the like. A system which is quite satisfactory for many purposes comprises a total of about 72 percent to 79 percent of two additional ethylenically unsaturated monomers and about 1.0 percent to about 8 percent of the unsaturated acid utilized as an internal catalyst. This amount is by no means critical, however, and the amount of monomers necessary in any interpolymerization reaction can readily be determined by simple experiment.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride which probably forms a monobutyl maleate ester quickly. Other acid catalysts such as oxalic acid, hydrochloric acid, or sulfuric acid, may also be utilized, although there is some possibility of gelation occurring if the catalyst is too strongly acidic. Alkaline catalysts such as sodium hydroxide, potassium hydroxide, hexamethylene-tetraamine, and other basic amines may also be utilized, and, in fact, there is evidence to indicate that the use of the basic catalysts tends to give faster curing resin films.

If desired, the catalyst may be dispensed with entirely, although it is difficult to obtain satisfactory reaction unless a catalyst is employed. The quantity of catalyst utilized may be varied widely; for example, as pointed out hereinabove, the more acidic the reaction medium, the greater the amount of etherification which will occur if an alcohol solution of the aldehyde is utilized. If the aldehyde is not used in the form of an alcoholic solution, it is preferred to utilize from about 0.2 percent to 1.0 percent by weight of catalyst, based upon the weight of the acrylamide interpolymer which is reacted with the aldehyde.

The reaction of the acrylamide interpolymer with the aldehyde can be carried out simply by adding the aldehyde and the catalyst (if one is utilized) to the polymerization mixture obtained by polymerizing acrylamide and one or more ethylenically unsaturated monomers and refluxing the resulting mixture for a period of from about 3 to 5 hours until a desired viscosity is obtained. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylol. It is preferred that the final resinous material have a solids content of about 20 percent to 70 percent.

Similar polymeric materials have also been successfully produced by first reacting the acrylamide or methacrylamide with an aldehyde such as formaldehyde to obtain an alkylol acrylamide or alkylol methacrylamide, for example, methylol acrylamide, or methylol methacrylamide, and then polymerizing the methylol derivative, thus obtained with the unsaturated acid and one or more of the ethylenically unsaturated monomeric materials disclosed hereinabove. The polymerization utilizing methylol acrylamide is carried out in substantially the same manner as when acrylamide is interpolymerized with two or more monomers, one of which is the unsaturated acid.

The N-methylol acrylamide or N-methylol methacrylamide may be replaced partially or completely by corresponding derivatives where the —OH group is —O-alkyl.

The resinous products obtained by the method of this invention all contain in the polymer chain recurrent

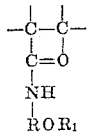

groups, wherein R is a lower aliphatic hydrocarbon radical, that is, the radical derived by removing oxygen from a lower aliphatic aldehyde; for example, if formaldehyde is utilized, the radical R represents a methylene group ($-CH_2$). When an alcoholic solution of the aldehyde, for example, a butanol solution of formaldehyde is employed, etherification may take place and at least a portion of the alcohol is reacted into the polymer chain so that at least some of the radicals $R_1$ will represent a lower alkyl radical such as butyl, or in other words, a mixture of hydrogen and butyl radicals. When the aldehyde is utilized alone, that is, not in an alcohol solution, the radical $R_1$, of course, will represent hydrogen. The free valences may be satisfied with either hydrogen or hydrocarbon, depending on the amide which is utilized.

As indicated hereinabove, the resinous materials obtained by the process of this invention are particularly useful in coating compositions. They may be utilized as the sole resinous component of such compositions, but preferably are blended with other resinous components such as epoxide resins, or epoxidized oils, vinyl resins, alkyl resins, amine resins, or the like.

The following example illustrates in detail the preparation of resinous materials by the process of this invention, and the use of such materials in coating compositions. The example is not intended to limit the invention, however, for there are, of course, numerous possible variations and modifications.

Example I

An interpolymer was prepared from the following components in the amounts set forth:

| Component | Parts by weight |
|---|---|
| Styrene | 39 |
| Ethyl acrylate | 44 |
| Acrylamide | 15 |
| Acrylic acid | 2 |
| Cumene hydroperoxide | 1 |
| Tertiary dodecyl mercaptan | 1 |

The mixture was refluxed for a total of 6 hours, during which time, an addition of cumene hydroperoxide in a quantity of 0.5 part by weight was made at the end of 2 hours and again at the end of 4 hours.

A solution of formaldehyde of a concentration of 40 percent in butanol was then added to the polymer in an amount to provide 2 moles of formaldehyde for each mole of acrylamide used in the interpolymer. The mixture was catalyzed with 0.33 part by weight of maleic anhydride and was refluxed for 3 hours, after which one half of the butyl alcohol was removed by distillation and replaced by an equal amount of xylene.

The interpolymer was not a gel, it was soluble in aromatic hydrocarbons, and it was not soluble in water—even in hot water. It was of much improved compatibility with many melamine-formaldehyde and urea-formaldehyde resins as compared to resin unmodified with acid. It could be mixed with pigments to provide relatively stable compositions, films of which would dry to a high gloss even after the compositions had been stored for substantial periods. It was capable of employment in the formulation of useful, hard, mar-resistant, grease resistant, detergent resistant, moisture resistant, and stain resistant, films of good flexibility and good adhesion to iron, steel, wood, and the like surfaces.

The acrylic acid employed as a monomer in formulating the interpolymer provides an internal catalyst in the film forming material, so that addition of external catalyst in order to obtain readily curable films is not required.

The interpolymer can be incorporated as a vehicular component into various enamels which usually contain pigments with or without other modifiers.

The formaldehyde modified interpolymer prepared in this manner was formulated into an appliance enamel as follows:

| Component | Parts by weight |
|---|---|
| Rutile titanium dioxide | 207 |
| Formaldehyde modified acrylamide interpolymer solution | 647 |
| Epoxy resin solution (60 percent solution in 15 percent methyl isobutyl ketone and 85 percent xylol; molecular weight of resin about 900) | 53 |
| Pine oil | 10.5 |
| Cellosolve acetate | 20 |
| Silicone solution (Linde X–12) | 2 |

(Linde X–12 is a 50 percent solution in toluene of ethylpolysiloxane.)

In formulating the enamel, the titanium dioxide was admixed with 147 parts of the formaldehyde modified acrylamide interpolymer and the mixture ground on a Kent 3-roll mill. The remaining interpolymer and the other remaining components were added and the mixture blended to a viscosity of 7 minutes, 14 seconds, in a Ford No. 4 Cup. The formulation was then reduced to a spray viscosity of 28 seconds in a No. 4 Ford Cup by the addition of xylol in an 8:5 ratio. The resulting coating composition before spray reduction had a total solids content of 58.4 percent.

The enamel thus prepared was sprayed onto both primed and unprimed steel panels to a film thickness of 1.33 mils and cured for 30 minutes at 300° F. The films had the following properties, the ratings being based on a comparison with a standard alkyd base appliance enamel:

| | |
|---|---|
| Cure | 200–350° F. |
| Gloss | 90+. |
| Pencil hardness | 3H. |
| Mar resistance | Excellent. |
| Adhesion to Bonderite treated steel | Excellent. |
| Impact resistance | 18–21 inch/pounds. |
| Immersion in vegetable oil (100 hours at 100° F. pencil hardness | 2H. |
| 250 hours salt spray exposure (unprimed) | Excellent. |
| 250 hours salt spray exposure (primed) | Excellent. |
| 100 hours detergent immersion (unprimed) | Excellent. |
| 500 hours detergent immersion (primed) | Excellent. |
| 100 hours salt detergent immersion (unprimed) | Good. |

500 hours salt detergent immersion (primed) _____ Excellent.
100 hours mustard stain resistance _____ No stain.
100 hours lipstick stain resistance _____ No stain.
100 hours ink stain resistance ___ No stain.

The stability of the pigmented composition was good and even after it had stood for a considerable period, films thereof were still capable of baking to a good gloss.

In the foregoing example, acrylic acid was utilized as the internal catalyst. However, it is to be understood that generally equivalent results can be obtained when other unsaturated carboxylic acids of the type disclosed hereinabove are employed. Similarly, the acrylic acid or other unsaturated acid can be utilized as a component of still other acrylamide interpolymers with good results.

*Example II*

This example illustrates the preparation of an interpolymer resin from a mixture containing an intermediate percentage of acrylic acid as an internal catalyst.

The reaction mixture comprises:

| | Parts by weight |
|---|---|
| Butyl acrylate | 48 |
| Methyl methacrylate | 38 |
| Acrylamide | 9 |
| Methacrylic acid | 5 |

This mixture is catalyzed with 5 parts by weight of benzoyl peroxide and is refluxed until 100 percent conversion is obtained. The methacrylic acid although it reacts as a monomer, is still capable of action as a catalyst when the resin is spread as a film.

This resin is incorporated with a mixture comprising two mols of formaldehyde per mole of acrylamide as a 40 percent solution in butanol. Apparently but a little more than one mol of hydrogen in the amido group reacts with the formaldehyde. The reaction is conducted under reflux and when it is completed as is evidenced by the cessation of the evolution of water, any excess of reagents is distilled off. The resultant resin is heat convertible. It contains its own internal catalyst and films formed thereof will cure to hard, durable state without addition of external catalyst.

It may be diluted with xylene or toluene and at a 50 percent solids content, the solution has a viscosity of V (Gardner-Holdt). It may be mixed with pigments to form an enamel.

It is also compatible with many urea-formaldehyde and melamine-formaldehyde resins, as well as other nitrogeniferous resins obtained by the reaction of formaldehyde and compounds containing reactive hydrogens attached to nitrogen. The resin, in appropriate solution in a solvent such as xylene or other medium with or without blending with urea or melamine resins, may be employed as a coating medium for decorating and/or protecting surfaces of woods, metal and other materials.

*Example III*

This example illustrates the use of a still higher percentage of monocarboxylic acid as a monomer in an interpolymerizable mixture.

The mixture comprises:

| | Parts by weight |
|---|---|
| Butyl alcohol | 500 |
| Acrylamide | 75 |
| Acrylic acid | 125 |
| Styrene | 300 |
| Cumene hydroperoxide | 5 |
| Tert. dodecyl mercaptan | 5 |

The acrylamide, acrylic acid, and styrene are the interpolymer-forming components. The cumene hydroperoxide is a catalyst. The tert. dodecyl mercaptan helps to control chain length.

The mixture is refluxed with agitation at 121 to 115° C. for 4.5 hours during which time further additions of 2.5 parts by weight of cumene hydroperoxide are made after 1.5 hours and again after 3 hours.

As a result of the reaction, a solution of an interpolymer resin is obtained and to this solution is added 180 parts by weight of a 40 percent solution of formaldehyde in butyl alcohol and 4.2 parts by weight of maleic anhydride designed to act as a catalyst of reaction between the formaldehyde and the interpolymer resin. Likewise, 100 parts by weight of toluene is added and the mixture is refluxed at a temperature in the range of 112 to 104° C. for 1.75 hours and at the conclusion of that interval, the mixture is distilled to remove 350 parts by weight of solvent mixture and 250 parts by weight of toluene are added.

The internally catalyzed resins in general are ungelled, are water insoluble, but are soluble in aromatic hydrocarbons. When pigmented, they provide coating compositions which can be stored for several weeks and which after such storage, are still capable of providing films having high gloss.

The total solids of the resin solution is 52.8 percent. The viscosity is $Z_1$ on the Gardner-Holdt scale.

Films of this material when spread upon a test panel and baked for one-half hour at 200° F., have a Sward hardness of 56. Similar films baked at 250° F. for 30 minutes have a Sward hardness of 60.

Films of this material upon iron, steel, wood, or the like can be baked to provide hard films at a substantially lower temperature than can corresponding resins of the same components but of lower acrylic acid content. This is a feature especially important in the coating of surface where high baking temperatures are not possible. The resin solutions can readily be incorporated with solutions of nitrogeniferous resins such as melamine resins and formaldehyde resins to provide compatible mixtures which when spread and baked form clear, hard, and durable films.

*Example IV*

The reaction charge in this example comprises:

| | Parts by weight |
|---|---|
| Butyl alcohol | 500 |
| Acrylamide | 75 |
| Butyl acid maleate | 125 |
| Styrene | 300 |
| Cumene hydroperoxide | 5 |
| Tertiary dodecyl mercaptan | 5 |

The mixture is refluxed 1.5 hours and 2.5 parts by weight cumene hydroperoxide are added. Refluxing is continued for an additional 1.5 hours and again 2.5 parts by weight of cumene hydroperoxide are added. The mixture is then refluxed for a further 1.5 hours. The product is a solution of interpolymer of the three monomers.

To the solution are added 180 parts by weight of a 40 percent solution of formaldehyde in butyl alcohol and 4.2 parts by weight of maleic anhydride. The resultant solution is refluxed at 112–104° C. for 1.75 hours. From the solution is distilled 250 parts by weight of solvent (largely butyl alcohol) and 250 grams of toluene is added. The resultant mixture is a solution of heat convertible resin which can be spread as a film upon surfaces such as iron or steel and cured to thermoset state by baking at 200 to 300° F. for 30 minutes without added external catalyst.

In the absence of the internal catalyst, bakes of at least 350° F. for 30 minutes are required, which preclude use of the materials in many industries unless extensive and costly oven modifications are made to provide for the higher temperatures.

The following example illustrates the use of an interpolymer in which a mixture of butanol and xylene is employed as a reflux medium.

Example V

The monomer system comprises:

| | Amount by weight |
|---|---|
| Ethyl acrylate | pounds 8.8 |
| Styrene | do 7.0 |
| Acrylamide | do 3.0 |
| Methacrylic acid | grams 545.0 |

To the monomers are added a solvent system comprising:

| | Pounds |
|---|---|
| Xylene | 10 |
| Butanol | 10 |

The mixture is catalyzed with 181 grams of cumene hydroperoxide. A small amount (90.8 grams) of tertiary dodecyl mercaptan is added as a chain stopper. The mixture is refluxed until reaction is complete or for about 6 hours.

To the monomer mixture is added 6.34 pounds of a 40 percent solution of formaldehyde in butyl alcohol and 36.0 grams of maleic acid. The mixture is refluxed until the resinous product is formed and the reaction is complete. This is accomplished in about 3 hours. From the mixture is distilled 11.0 pounds of solvent, and then 11 pounds of xylene and 2.2 pounds of epoxy resin of an epoxy equivalent of about 450 to 525 and known as Bakelite EKRB 2002 are added. The mixture is of a viscosity of U to W on the Gardner-Holdt scale. The acid value of the mixture is 14.7. The solids content is about 50 percent.

The interpolymer is soluble in aromatic hydrocarbons, is ungelled, and is insoluble in water.

Pigments, such as titanium dioxide, may be added and the pigmented materials are stable. Films thereof upon wood or steel are of good gloss even when formed from solutions which have been stored for several months.

Example VI

It has been indicated that the use of alcohols such as butanol may result in an appreciable lowering of the acid value of the resin product. To illustrate this point a reaction mixture was prepared comprising:

| | Pounds |
|---|---|
| Styrene | 15.8 |
| Methacrylic acid | 6.0 |
| Acrylamide | 15.0 |

The monomers were incorporated with 180.6 grams of cumene hydroperoxide, 90.8 grams of tertiary dodecyl mercaptan, and 20 pounds of butanol.

The mixture was refluxed for 6 hours and 6.34 pounds of a 40 percent solution of formaldehyde in butanol added. The mixture was refluxed for 3 hours, and 11.0 pounds of solvent were distilled and replaced with 12.2 pounds of toluene. A 2.2 pound quantity of epoxy resin as described in Example V was added. The solution had an acid value of 14.4 against a calculated acid value of 17.8.

The materials, after pigmentation, are stable and storage thereof for several months does not result in impairment of film gloss.

If the acid monomer is omitted, and acids such as phosphoric acid or lactic acid are added to obtain a cure of the films at lower temperatures, pigment stability is very substantially lowered. When the compositions have stood for a week or even less, they are no longer capable of forming films of high gloss.

Emphasis has been placed upon the fact that the use of free acid monomers in the interpolymer to provide internally catalyzed, soluble resins, results in compositions which when pigmented are exceptionally stable. In those instances where the pigmented compositions can be used promptly, such high pigment stability may not be necessary. It is then permissible to add free acids such as phosphoric acid, lactic acid, and the like in order to obtain resins that are capable of curing at low temperature, but still are of good compatibility with epoxy or other resins.

In the foregoing examples, acrylic acid and methacrylic acid are essentially interchangeable. Acrylamide may be replaced by methacrylamide.

In the heat convertible resins of the foregoing examples and in similar resins, it appears that the monomers comprising the ethylenically unsaturated acid and the added monomer free of amido groups and carboxyl groups are susceptible of association in a variety of different ways such as may be dictated in well known manner by the Laws of Chance. They may also be in blocks, branches, or other forms in accordance with a preconceived pattern or arrangement obtained by well understood techniques of polymerization. For example, the groups from the monomer acid may be interspersed more or less regularly with the groups from the other monomers or several units of a given monomer may be directly joined together to provide a moiety of considerable length from which units from the other monomer are excluded.

It appears that the general or average structure of the units making up the heat hardenable internally catalyzed resin molecules are approximately as follows:

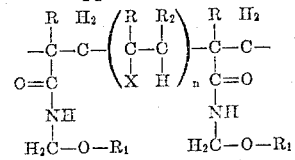

In the formula, groups X are negative radicals such as usually characterize polymerizable monomers. It is sometimes possible that an entire parenthetical group may be from a single monomer. The other monomer or monomers may then comprise other parenthetical groups in the same or different resins molecules. In accordance with the invention, some of them are carboxylic; but some may also be non-carboxylic and non-amido. For instance, they may be aromatic or aliphatic hydrocarbon, or they may be ester, nitrile ($-C \equiv N$), or the like. The groups X may also comprise pendant chains of one or more of the monomer units.

Groups R may be of a class consisting of hydrogen and alkyl groups. Groups $R_1$ are of a class consisting of hydrogen and lower hydrocarbons containing for example, from 1 to about 7 carbon atoms and being represented by methyl, ethyl, propyl, butyl, amyl, hexyl, and benzyl groups.

Group $R_2$ is of a class comprising hydrogen, methyl and moieties of the formula:

where Y may be hydrogen or lower hydrocarbon such as methyl, ethyl, propyl, butyl or benzyl.

In the formula, from about 5 to about 30 percent of the groups X may be carboxylic, the rest of course, being characteristic negative radicals of a monomer other than carboxyl or amido.

The symbol $n$ is a number at least 1 and may be higher, for example, up to 10 or more.

In general, those compositions containing high percentages of styrene or vinyl toluene or similar monomers that form hard resins tend to be quite hard. Those containing large amounts of ester monomers such as ethyl acrylate tend to be more soft and flexible.

In the foregoing example, the use of acrylamide or methacrylamide as the amide monomer has been emphasized. Other polymerizable amide monomers such as maleuric acid and esters thereof as represented by the formula:

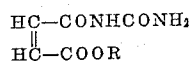

and its imide derivative such as N-carbamyl maleimide of the structure:

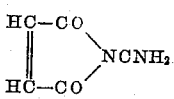

may be substituted in part or in toto therefor.

In the curing of films of the foregoing resin solutions, it appears that the solvents evaporate, at least to a substantial degree. The remaining resin solids then cure to hard thermoset state. It appears that the curing action involves crosslinking through the methylol groups or alkoxymethyl groups and is promoted by the available carboxyls in the resin molecules. However, it is not desired to limit the claims to any specific theory of chemical reactions in the heat conversion stage.

Accordingly it is to be understood that the invention is not intended to be limited by the specific examples, but to include all of the variations and modifications falling within the scope of the appended claims.

This application is a continuation-in-part of my copending application, Serial No. 562,595, filed January 31, 1956, and now abandoned.

I claim:

1. A resinous composition which is insoluble in water, and which comprises an interpolymer of (A) an amide selected from the group consisting of acrylamide, methacrylamide and itaconic diamide, (B) a monoethylenically unsaturated aliphatic carboxylic acid consisting of atoms of carbon, hydrogen and oxygen, and (C) at least one other monomer containing a C=CH$_2$ group, said interpolymer containing from about 5 to about 50 percent by weight of said amide based upon the total weight of said interpolymer, and about 1 to about 30 percent upon a like basis of said monoethylenically unsaturated aliphatic carboxylic acid, said interpolymer being characterized by having amido hydrogen atoms replaced by the structure

wherein R is a member selected from the group consisting of hydrogen, furyl and a saturated lower aliphatic hydrocarbon radical and R$_1$ is a member selected from the group consisting of hydrogen, lower alkyl and butoxyethyl, said monoethylenically unsaturated aliphatic carboxylic acid functioning as an internal curing catalyst in said resinous composition.

2. The resinous composition of claim 1 wherein R and R$_1$ are each hydrogen atoms.

3. The resinous composition of claim 1 wherein the structure

is present in an amount of at least about 0.2 equivalent for each amide group of said interpolymer.

4. The resinous composition of claim 3 wherein R and R$_1$ are each hydrogen atoms.

5. The resinous composition of claim 1 wherein R$_1$ is lower alkyl.

6. An article having a metallic surface having as a coating thereon a hardened resinous composition of claim 1.

7. A resinous composition which is insoluble in water, and which comprises an interpolymer of (A) acrylamide, (B) a monoethylenically unsaturated aliphatic carboxylic acid selected from the group consisting of acrylic acid, methacrylic acid, butyl acid maleate, crotonic acid, maleic acid, fumaric acid and itaconic acid, and (C) styrene, said interpolymer containing from about 5 to about 50 percent by weight of acrylamide based upon the total weight of said interpolymer, and about 1 to about 30 percent upon a like basis of said monoethylenically unsaturated aliphatic carboxylic acid, said interpolymer being characterized by having amido hydrogen atoms replaced by the structure

wherein R is a member selected from the group consisting of hydrogen, furyl and a saturated lower aliphatic hydrocarbon radical and R$_1$ is a member selected from the group consisting of hydrogen, lower alkyl and butoxyethyl, said monoethylenically unsaturated aliphatic carboxylic acid functioning as an internal curing catalyst in said resinous composition.

8. The resinous composition of claim 7 wherein the structure

is present in an amount of at least about 0.2 equivalent for each amide group of said interpolymer.

9. The resinous composition of claim 4 wherein said amide (A) is acrylamide.

10. The resinous composition of claim 1 wherein said interpolymer is an interpolymer of acrylamide, methacrylic acid and styrene.

11. The resinous composition of claim 1 wherein said interpolymer is an interpolymer of acrylamide, methacrylic acid, ethyl acrylate and styrene.

References Cited in the file of this patent

UNITED STATES PATENTS

| | | |
|---|---|---|
| 2,173,005 | Strain | Sept. 12, 1939 |
| 2,205,355 | Grimm | June 18, 1940 |
| 2,476,527 | Barnes | July 19, 1949 |
| 2,761,834 | Suen et al. | Sept. 4, 1956 |
| 2,761,856 | Suen et al. | Sept. 4, 1956 |
| 2,886,557 | Talet | May 12, 1959 |

FOREIGN PATENTS

| | | |
|---|---|---|
| 467,492 | Great Britain | June 11, 1937 |

UNITED STATES PATENT OFFICE
CERTIFICATE OF CORRECTION

Patent No. 2,978,437                                  April 4, 1961

Roger M. Christenson

It is hereby certified that error appears in the above numbered patent requiring correction and that the said Letters Patent should read as corrected below.

Column 1, lines 23 and 24, for "Serial No. 594,391 as of June 28, 1956" read -- Serial No. 584,473 as of May 14, 1956 --.

Signed and sealed this 28th day of January 1964.

(SEAL)
Attest:
ERNEST W. SWIDER                                EDWIN L. REYNOLDS Attesting Officer                              Acting Commissioner of Patents

REEXAMINATION CERTIFICATE (334th)
United States Patent [19]
Christenson

[11] B1 2,978,437
[45] Certificate Issued Apr. 16, 1985

[54] WATER-INSOLUBLE CONDENSATION PRODUCTS OF ALDEHYDES AND ACRYLAMIDE INTERPOLYMERS

[75] Inventor: Roger M. Christenson, Richland Township, Allegheny County, Pa.

[73] Assignee: Pittsburgh Plate Glass Company, Allegheny County, Pa.

Reexamination Request:
No. 90/000,467, Nov. 14, 1983

Reexamination Certificate for:
Patent No.: 2,978,437
Issued: Apr. 4, 1961
Appl. No.: 665,109
Filed: Jun. 12, 1957

Certificate of Correction issued Jan. 28, 1964.

Related U.S. Application Data
[63] Continuation-in-part of Ser. No. 562,595, Jan. 31, 1956, abandoned.

[51] Int. Cl.³ .................. C08L 63/02; C08L 61/20
[52] U.S. Cl. ................................. 525/163; 428/458; 428/460; 525/101; 525/110; 525/158; 525/385
[58] Field of Search ............ 260/80.5, 73, 72, 86.1 N, 260/8, 89.7; 525/163, 101, 110, 158, 385; 428/458, 460

[56] References Cited
U.S. PATENT DOCUMENTS
2,870,116  1/1959  Vogel et al. ................ 260/45.5
2,870,117  1/1959  Vogel et al. ................ 260/45.5

*Primary Examiner*—Theodore Pertilla

EXEMPLARY CLAIM

1. A resinous composition which is insoluble in water, and which comprises an interpolymer of (A) an amide selected from the group consisting of acrylamide, methacrylamide and itaconic diamide, (B) a monoethylenically unsaturated aliphatic carboxylic acid consisting of atoms of carbon, hydrogen and oxygen, and (C) at least one other monomer containing a $C=CH_2$ group, said interpolymer containing from about 5 to about 50 percent by weight of said amide based upon the total weight of said interpolymer, and about 1 to about 30 percent upon a like basis of said monoethylenically unsaturated aliphatic carboxylic acid, said interpolymer being characterized by having amido hydrogen atoms replaced by the structure

wherein R is a member selected from the group consisting of hydrogen, furyl and a saturated lower aliphatic hydrocarbon radical and $R_1$ is a member selected from the group consisting of hydrogen, lower alkyl and butoxyethyl, said monoethylenically unsaturated aliphatic carboxylic acid functioning as an internal curing catalyst in said resinous composition.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-11 is confirmed.

* * * * *